(12) United States Patent
Soman et al.

(10) Patent No.: US 10,412,306 B1
(45) Date of Patent: Sep. 10, 2019

(54) OPTICAL IMAGE STABILIZATION METHOD AND APPARATUS

(71) Applicant: QUALCOMM Incorporated, San Diego, CA (US)

(72) Inventors: Mehul Soman, Sunnyvale, CA (US); Victor Kulik, San Jose, CA (US); Russel Allyn Martin, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/107,622

(22) Filed: Aug. 21, 2018

(51) Int. Cl.
*H04N 5/232* (2006.01)

(52) U.S. Cl.
CPC ..... *H04N 5/23287* (2013.01); *H04N 5/23258* (2013.01); *H04N 5/23299* (2018.08); *H04N 5/232933* (2018.08)

(58) Field of Classification Search
CPC .......... H04N 5/23251; H04N 5/23287; H04N 5/23258; H04N 5/23299; H04N 5/232933; H04N 5/2328; G03B 2205/0015; G03B 2205/0007; G03B 2205/0023;
(Continued)

(56) References Cited

U.S. PATENT DOCUMENTS

| 2008/0212154 A1* | 9/2008 | Feinsod | G02B 27/20 |
| | | | 359/196.1 |
| 2011/0164863 A1* | 7/2011 | Hayashi | G02B 27/646 |
| | | | 396/55 |

(Continued)

*Primary Examiner* — Chiawei Chen
(74) *Attorney, Agent, or Firm* — Brian Momeyer

(57) ABSTRACT

Disclosed are systems, devices, and methods for compensating for roll blur in an optical image stabilization (OIS) module. An OIS controller receives a selection for one or more areas of interest (AOI), each AOI associated with an image optimization point (IOP), and each IOP is associated with an X position ($X_{pos}$) and a Y position ($Y_{pos}$). The OIS controller receives gyroscope data comprising X axis rotation data ($X_{gyro}$), Y axis rotation data ($Y_{gyro}$) and Z axis rotation data ($Z_{gyro}$). The OIS controller generates adjusted X axis rotation data ($X_{gyro\_adj}$) and Y axis rotation data ($Y_{gyro\_adj}$), wherein $X_{gyro\_adj}$ and $Y_{gyro\_adj}$ based on the Z axis rotation data and the one or more IOPs and adjusts lens shift gain on the basis of $X_{gyro\_adj}$ and $Y_{gyro\_adj}$ and adjusts lens movement based at least in part on the lens shift gain.

27 Claims, 6 Drawing Sheets

(58) Field of Classification Search
CPC ............ G03B 2205/0038; G02B 27/64; G02B 27/644; G02B 27/646
See application file for complete search history.

(56) References Cited

U.S. PATENT DOCUMENTS

| | | | |
|---|---|---|---|
| 2012/0120264 A1* | 5/2012 | Lee ........................... | G06T 7/20 348/208.4 |
| 2012/0307089 A1* | 12/2012 | Rukes .................... | H04N 5/232 348/208.99 |
| 2015/0109468 A1* | 4/2015 | Laroia .................... | G02B 13/02 348/208.6 |
| 2015/0288874 A1* | 10/2015 | Sivan ................. | H04N 5/23222 348/207.11 |
| 2016/0360110 A1* | 12/2016 | Kimura ............... | H04N 5/23254 |
| 2017/0034410 A1* | 2/2017 | Yoo .................... | H04N 5/23216 |
| 2018/0103206 A1* | 4/2018 | Olson .................. | H04N 5/2252 |
| 2018/0120674 A1* | 5/2018 | Avivi ...................... | G02B 27/0075 |
| 2018/0217475 A1* | 8/2018 | Goldenberg ............. | G03B 3/10 |
| 2018/0329275 A1* | 11/2018 | Endo ........................ | G03B 5/00 |
| 2019/0004279 A1* | 1/2019 | Park ........................ | G02B 7/02 |
| 2019/0058821 A1* | 2/2019 | Lee ........................... | G06T 7/11 |

\* cited by examiner

OPTICAL IMAGE STABILIZATION METHOD AND APPARATUS

BACKGROUND

Field

This disclosure relates generally to determining optical and mechanical alignment of an optical image stabilization (OIS) system and, more particularly, to techniques for reduction of image blur during a rotation or tremor about the lens axis.

Background

Advances in technology have enabled electronic devices, including mobile devices, with an ever-increasing set of capabilities. More and more devices include a camera with digital imaging functions. However, due to often being hand held, such devices may be subject to blurring and other effects that may reduce the quality of an image. Image stabilization technology attempts to compensate for camera motion when a user is taking a picture or recording video. Often, the user's hand that is holding the camera will move inadvertently or shake at the moment of image capture, or the user may move the camera intentionally such as during panning or tracking an object. In addition, a camera may be mounted on a selfie-stick, or a bicycle, or a helmet, which may undergo motion, shaking, and tremors. Image stabilization is intended to counteract these movements, whether intentional or unintentional, thereby improving the sharpness and overall quality of images produced by a camera.

Digital image stabilization refers to stabilization of an image after it has been captured or recorded. That is, image data already recorded by the camera can be modified electronically or by software after its capture to compensate for camera motion. For example, software-implemented algorithms may reduce warping, distortion, or other perspective artefacts after-the-fact in digital image stabilization. In contrast, optical image stabilization refers to stabilization of physical parts or components (e.g., lens, sensor, etc.) to counteract inadvertent or intentional camera motion during capture. In optical image stabilization, the camera may be equipped with additional electro-mechanical components that aim to compensate for hand motion, camera shake, and other such artefacts as they happen.

More and more electronic devices not only include a camera with digital imaging functions, but include motion sensors (e.g., gyroscopes) for detecting motion of the electronic device. Measurements made by the gyroscope can assist in determining the compensatory motion of physical parts or components of the camera for counteracting inadvertent or intentional camera motion during capture. However, there are unmet needs for improved motion compensation.

SUMMARY

One aspect of the subject matter of this disclosure can be implemented in a method. The method includes adjusting lens movement to image movement in an optical image stabilization (OIS) module/component, or image stabilizer module/component, wherein the OIS module/component comprises a lens and an image sensor optically coupled with the lens, and wherein adjusting the lens movement to image movement comprises: receiving a selection for one or more areas of interest (AOI), the AOI having one or more image optimization points (IOPs), wherein each IOP is associated with an X position ($X_{pos}$) and a Y position ($Y_{pos}$); receiving gyroscope data comprising X axis rotation data ($X_{gyro}$), Y axis rotation data ($Y_{gyro}$) and Z axis rotation data ($Z_{gyro}$); adjusting lens shift gain, wherein adjusting lens shift gain comprises generating adjusted X axis rotation data ($X_{gyro\_adj}$) and Y axis rotation data ($Y_{gyro\_adj}$), wherein $X_{gyro\_adj}$ and $Y_{gyro\_adj}$ are generated based at least in part on the Z axis rotation data and the one or more IOPs; and adjusting lens movement based at least in part on the lens shift gain.

Another aspect of the subject matter of this disclosure can be implemented in an apparatus. The apparatus may be an apparatus for adjusting lens movement, comprising: a lens; an image sensor; a gyroscope; and an OIS controller, wherein the OIS controller is operably configured to: receive a selection for one or more areas of interest (AOI), the AOI having one or more image optimization points (IOPs), wherein each IOP is associated with an X position ($X_{pos}$) and a Y position ($Y_{pos}$); receive gyroscope data comprising X axis rotation data ($X_{gyro}$), Y axis rotation data ($Y_{gyro}$) and Z axis rotation data ($Z_{gyro}$); adjust lens shift gain, wherein adjusting lens shift gain comprises generating adjusted X axis rotation data ($X_{gyro\_adj}$) and Y axis rotation data ($Y_{gyro\_adj}$), wherein $X_{gyro\_adj}$ and $Y_{adj}$ are generated based at least in part on the Z axis rotation data and the one or more IOPs; and adjust lens movement based at least in part on the lens shift gain.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
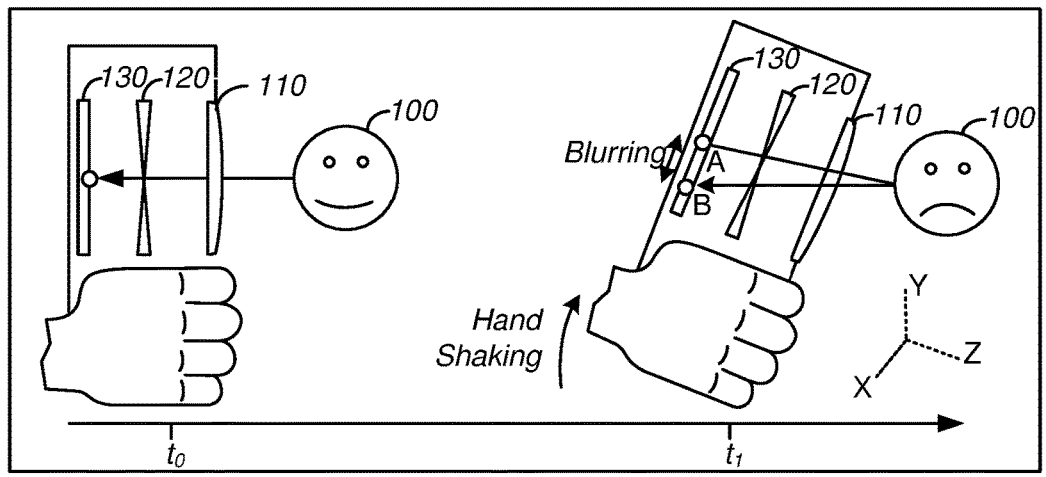
FIGS. 1A and 1B show schematic illustrations of the effects of camera movement on images with and without a correction element.

The following description is directed to certain implementations for the purposes of describing the innovative aspects of this disclosure. However, a person having ordinary skill in the art will readily recognize that the teachings herein can be applied in a multitude of different ways. The described aspects or features may be implemented in any device, apparatus, or system that includes an OIS system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

An electronic device, such as a mobile device, can include a camera, a gyroscope, and an OIS module/component configured to move one or more parts of the camera to compensate for camera motion. The gyroscope and the OIS module/component may be separate from each other in the electronic device.

Image stabilization is used to reduce blurring and other effects associated with camera motion during the time an image sensor of a camera is exposed to a capturing environment. User movements of a camera can be characterized by pan and tilt movements, where the angular movements are known as yaw and pitch, respectively. Hand tremors often affect movements in at least two axes, which can adversely affect image quality. Rotation about the lens axis (roll) can also occur, but conventional solutions do not compensate for this by moving the lens and, so, has not been considered in conventional OIS. Image stabilization techniques, including the improved OIS apparatus and method described herein, aim to reduce, among other effects, the effect of rotation about the lens axis on image quality.

For a camera with a moving camera lens or correction element, as is typical in a conventional OIS system, which moves the camera lens or correction elements according to the gyroscopic measurements, there is a limitation of non-uniform image quality improvement. This leads to the best performance of the OIS being maximum at the center of the image (or periphery) and smaller as it moves to the periphery (or to the center). Post-processing such as Electronic Image Stabilization (EIS) systems do not compensate for rotational image blur, and add to the overhead of the camera processing subsystem.

If, for example, the OIS lens shift is optimized for best blur reduction at the center of an image, the peripheral points will be undercompensated by:

$$\frac{1}{\cos\left(\frac{FOV}{2}\right)^2} - 1 \qquad \text{Equation 1}$$

Which is 33% for a typical field of view (FOV) of 60 degrees.

If, for example, the OIS lens shift is optimized for best blur reduction at the periphery of an image, the center points will likewise be undercompensated. Thus, by tuning the gain, OIS compensation may be optimized for a particular region of an image.

If a full image can be defined as Height×Width (H×W) pixels, let area of interest (AOI) be a certain section of the full image defined by a second H×W pixels, or a set of pixels (S), or by a set of four corner-pixel positions. An AOI may also be defined as an angle (or deviation angle) or set of angles from an image center, corner, or side. Based on the scene or objects in the image, the OIS performance can be optimized for one or more AOIs while allowing reduced performance in other areas. Such an area of interest can be obtained through multiple ways including user input, camera algorithms, image recognition algorithms, client applications, etc. Then, the required OIS gain (lens shift) can be used to improve OIS performance in the one or more AOIs.

For example, a user could select an AOI through the view finder, or by tapping on the touchscreen, and allowing the user to draw a shape or select elements of a grid displayed on the touchscreen or view finder. In another example, by tracking one or more irises or a face, a device could select the AOI by a determination of what a user is focusing upon. In another example, the AOI could be determined by the time a user's eyes are focused on a particular region of the image or scene. AOIs may also be identified based upon key points in a scene, such as faces, trees, buildings, human figures, animal figures, luminance of objects in the scene, color of objects in the scene, or auditory emanations from objects in the scene. An AOI may be determined or refined by an auto focus algorithm, or through the input from a client application. An AOI may also be determined by tracking one or more objects within a field of view of the lens.

An image may have multiple AOIs selected or determined. In this case, the OIS system may optimize the region with a maximum blur measurement, or minimum sharpness. An exemplary embodiment may also optimize a region between multiple AOIs to provide a compromise for the blur of the selected or determined AOIs, such as with a weighted average of AOIs.

For a rolling shutter camera, assuming the voice coil motor (VCM) can support high enough rates, OIS can be optimized for the region read out first followed by other regions. In this case, multiple lens movements are required within the frame duration to effectively optimize OIS performance for the image. Also, the AOI should be sufficiently spaced apart to support this implementation.

Gyroscopic sensors as used in modern devices typically measure angular acceleration and output three axes of measurement, the X, Y, and Z axes. The gyroscope is typically used in OIS systems to compensate for hand tremors around the X (pitch) axis and Y (yaw) axis. Measurements from the gyroscope are used to compensate for the hand tremors by shifting the lens in real time. Typical OIS compensation systems can only handle a uniform shift in an image and thus only take into account X and Y axis tremors. One benefit of the embodiments described herein is compensation of tremors along the Z axis. To achieve this benefit, after the AOI is selected, the image optimization point including an $X_{pos}$ and $Y_{pos}$ are determined. $X_{pos}$ and $Y_{pos}$ may be determined by determining the center point of the AOI or AOIs, an average of all points in the AOI or AOIs, an intersection of vectors drawn between points in the one or more AOIs, or other methods. After the image optimization point is selected, the gyroscope data for the pitch and yaw ($X_{gyro}$ and $Y_{gyro}$) may be adjusted on the basis of $X_{pos}$, $Y_{pos}$, and the gyroscopic measurement of roll about the Z axis ($Z_{gyro}$). Such an adjustment may generate an adjusted gyroscopic measurement, consisting of the coordinates $X_{gyro\_adj}$ and $Y_{gyro\_adj}$, via the following equation:

$$X_{gyr\_adj} = X_{pos} \pm Y_{pos} * Z_{gyro}$$

$$Y_{gyr\_adj} = Y_{pos} \pm X_{pos} * Z_{gyro} \quad \text{Equation 2}$$

Additionally, to calculate $X_{gyro\_adj}$, in equation 2, $Z_{gyro}$ may also be multiplied by a constant, or another operation may be performed upon $Z_{gyro}$, such as sin, cos, tan, or another trigonometric operator. Likewise, in order to calculate $Y_{gyro\_adj}$, in equation 2, $Z_{gyro}$ may also be multiplied by a constant, or another operation may be performed upon $Z_{gyro}$, such as sin, cos, tan, or another trigonometric operator.

FIG. 1A shows a schematic illustration of the effects of camera movement on images without correction by a correction element. Typically, hand shaking can result in vibration identifiable as an oscillating signal with an amplitude and frequency, such as an amplitude of about 0.5 degrees and a frequency in the range of about 2 Hz to about 20 Hz. In FIG. 1A, a target 100 can be captured by a camera via an optical path through a lens 110 of the camera. At time $t_0$ the optical path passes through the lens 110 and a correction element 120 and onto an image sensor or imager 130. Between time $t_0$ and $t_1$, hand movement occurs that changes the optical path from the target 100 to the image sensor 130. The movement causes the lens 110 to move, thereby changing the optical path when the correction element 120 does not correct for the change in the optical path. The image on the image sensor 130 shifts from point A to point B at time $t_1$. The result can be blurring of the image on the image sensor 130.

Figure 1B:
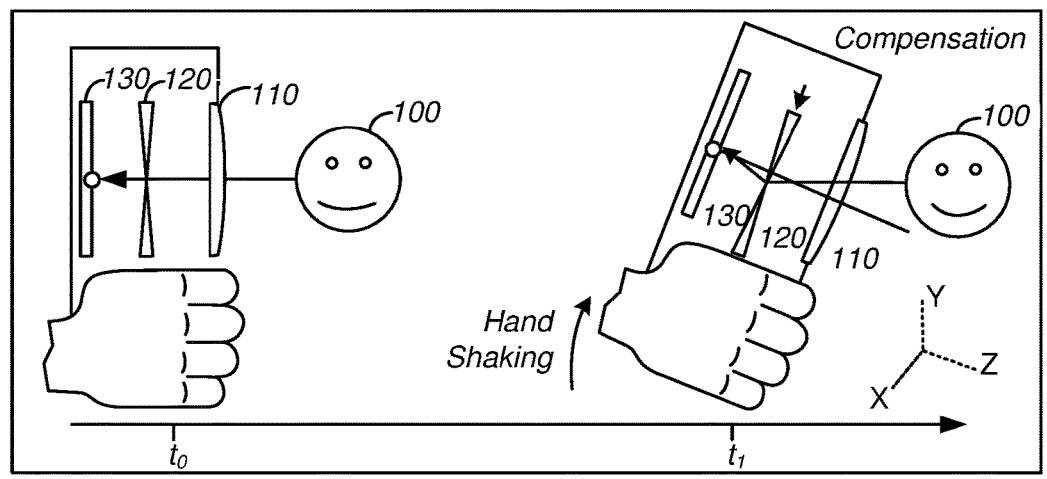

FIG. 1B shows a schematic illustration of the effects of movement on images with correction by a correction element. As in FIG. 1A, a target 100 can be captured by a camera via an optical path through a lens 110 of the camera at time $t_0$. In spite of the movement between time $t_0$ and $t_1$, the image on the image sensor 130 does not shift because of compensation by the correction element 120. The correction element 120 can move between time $t_0$ and $t_1$ to re-adjust the optical path so that the image on the image sensor is the same at time $t_0$ and $t_1$. OIS is a mechanical technique used in cameras to stabilize an image by controlling the optical path to the image sensor 130. In some implementations, the correction element 120 can be a lens or another moving part of the camera that corrects the optical path, such as a part that corrects a position of the lens 110.

An OIS module/component may be implemented with a camera to control the optical path to an image sensor. The OIS module/component may be a lens-based stabilization system or a sensor-based stabilization system. In a lens-based stabilization system, one or more parts of an optical lens attached to the camera are moved by an actuator or driver, which compensates for camera movement. Conversely, in a sensor-based stabilization system, an image sensor is moved by an actuator or driver to perform such compensation.

Figure 2:
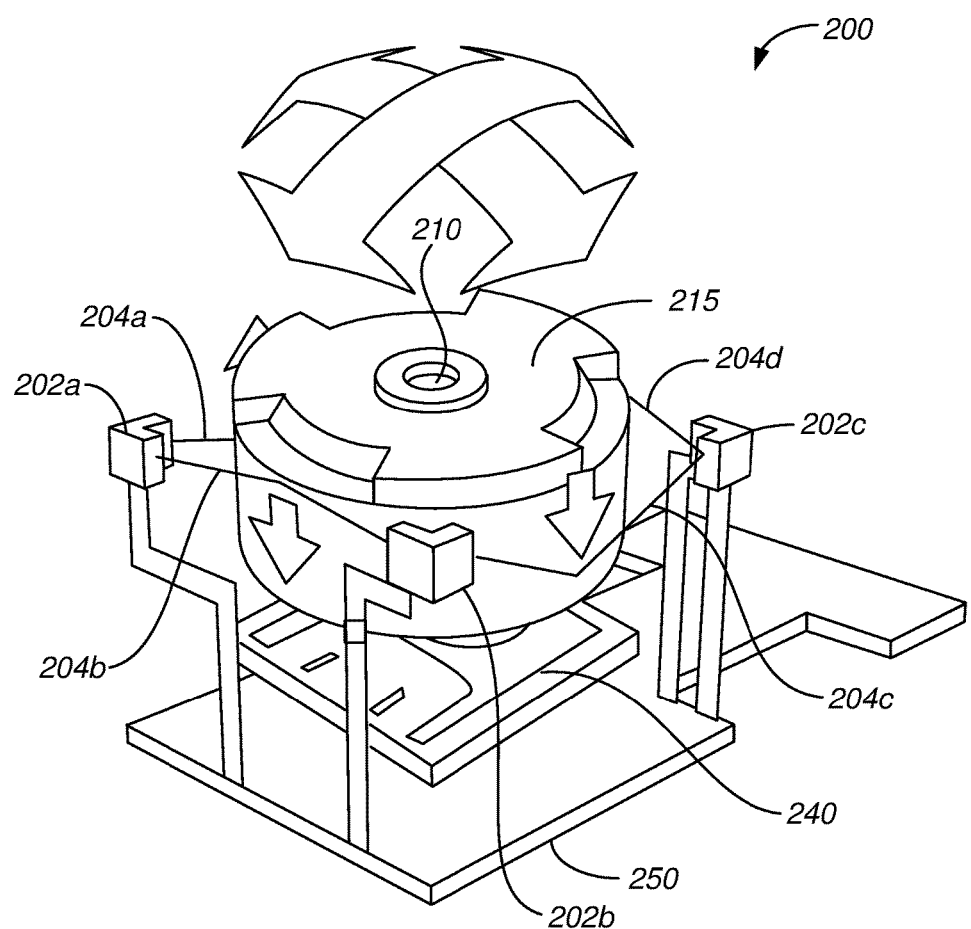
FIG. 2 shows a perspective view of a schematic illustration of an example optical image stabilization (OIS) module/component according to some implementations.

FIG. 2 shows a perspective view of a schematic illustration of an example OIS module/component according to some implementations, where the OIS module/component is a lens-based stabilization system. A lens-based OIS module/component 200 includes an optical lens 210 and an image sensor 240. The optical lens 210 may be supported in a barrel or holder 215. The optical lens 210 may be configured to direct an optical path of an image onto the image sensor 240. In some implementations, the image sensor 240 is supported on a printed circuit board (PCB) 250.

Movement of the optical lens 210 in at least two axes (e.g., x-axis and y-axis) may be controlled by an actuator. In some implementations, the actuator may be based on any suitable technology for controlling movement of the optical lens 210, such as liquid lens, shape memory alloy, piezoelectric motor, voice coil motor technology, or other linear actuator. Typically, movement of the optical lens 210 may be controlled by one or more voice coil motors (VCMs). VCMs utilize the interaction between current-carrying coil windings and magnets, where current applied to the coil windings generate electromagnetic fields that interact with the magnets to apply a force on the barrel or holder 215 of the optical lens 210. The force causes the barrel or holder 215 of the optical lens 210 to move by a distance related to the applied current, where the distance can be directly proportional to the applied current in the zeroth order of approximation. For example, the VCMs may include a pair of first magnets and a pair of second magnets disposed on both sides of an optical axis, respectively. The VCMs may further include a pair of first coils and a pair of second coils disposed on both sides of the optical axis, respectively. The actuator may include springs 204a, 204b, 204c, and 204d supported by supports 202a, 202b, 202c, and 202d. The actuator may control a position of the barrel or holder 215 using springs 204a, 204b, 204c, and 204d when a force is exerted upon them.

A position of the optical lens 210 may be detected using one or more position sensors, such as one or more Hall sensors. The actuator may move the position of the optical lens 210 using force generated by one or more VCMs. The actuator receives position information of the optical lens 210 from the one or more Hall sensors, and moves the position of the optical lens 210 using the one or more VCMs. Based on the detected position of the optical lens 210, a controller may send one or more control algorithms for moving the position of the optical lens 210 accordingly. Thus, the position of the optical lens 210 may be controlled by a feedback loop using VCMs for actuation and Hall sensors for position detection.

Camera motion or camera shake can be measured by observing angular displacements. A gyroscope can measure angular displacement of a camera. Generally, a gyroscope outputs an angular rate, where the angular rate can be filtered and integrated to generate an angle or angular displacement. In some implementations, limits on the angle or angular displacement can be imposed so that the gyroscope accounts for hand shaking and hand tremors. That way, the gyroscope accounts for small vibrations in the range of a few Hertz to several tens of Hertz. In some implementations, with respect to filtering angular motion being provided to an OIS module/component, the gyroscope movement can be limited to movement within plus or minus three degrees, plus or minus two degrees, or plus or minus one degree. Measurements made by the gyroscope can be sent to the controller for determining appropriate lens movement by the actuator, where the controller provides angular rotation data for the actuator for positioning and holding the optical lens 210.

Figure 3A:
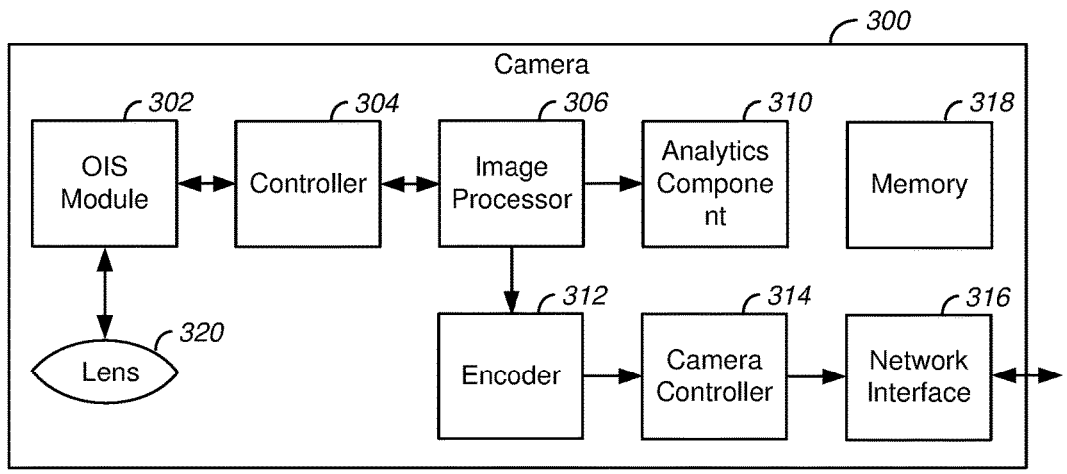
FIG. 3A shows a block diagram representation of an example camera configured to implement an OIS module/component according to some implementations.

FIG. 3A shows a block diagram representation of an example camera configured to implement an OIS module/component according to some implementations. A camera 300 may be a digital or still camera. In some implementations, the camera 300 is a standalone camera. In some implementations, the camera 300 is embedded in an electronic device, such as a mobile phone (e.g., smartphone), a tablet computer, a laptop, a handheld gaming device, and a wearable device (e.g., smart watch).

The camera 300 includes an OIS module/component 302, a controller 304, and an image processor 306. The OIS module/component 302 may also be referred to as a camera module/component or imaging component. In some implementations, the camera 300 further includes analytics 310, an encoder 312, camera controller 314, network interface 316, and memory 318. At least some of the components of the camera 300 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

The OIS module/component 302 may include or at least be coupled to a lens 320, where the OIS module/component 302 is configured to control a position of the lens 320. The OIS module/component 302 may be part of an imaging component that may function with the controller 304 to capture images of a target or a scene. In addition to controlling the position of the lens 320 for optical image stabilization using the OIS module/component 302, the imaging component may also control various aspects of the camera's operation such as, for example, aperture opening amount, exposure time, etc. Image processor 306 may process incoming digital signals into frames of pixels and process each frame.

Figure 3B:
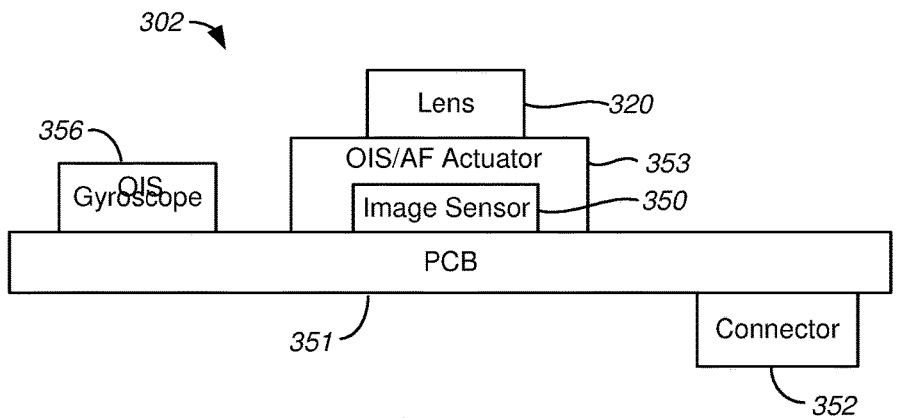
FIGS. 3B and 3C show block diagram representations of an example OIS module/component according to some implementations.
Figure 3C:
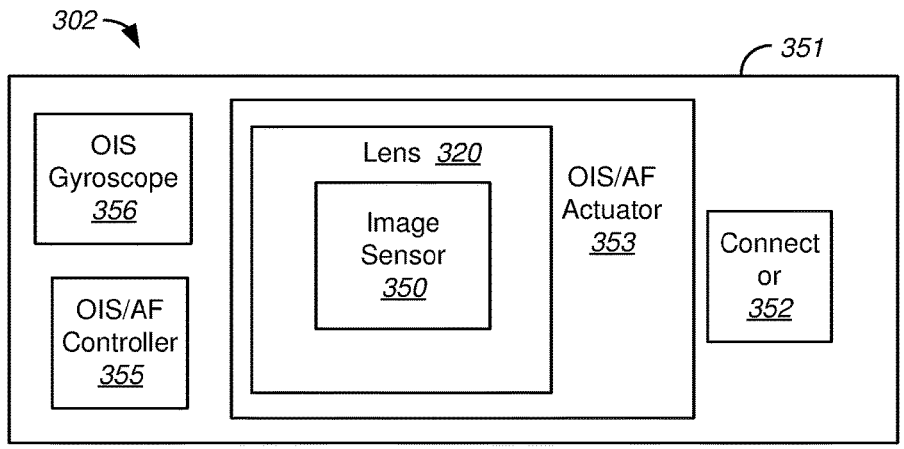

FIGS. 3B and 3C show block diagram representations of an example OIS module/component according to some implementations. The OIS module/component 302 may include an image sensor 350 mounted on a PCB 351. In some implementations, the image sensor 350 includes a charge-coupled device (CCD) or complementary metal-oxide semiconductor (CMOS) image sensor for converting an incident object image to electrical image signals. The OIS module/component 302 may further include an OIS/auto-focus (AF) actuator 353 coupled to the lens 320, where the OIS/AF actuator 353 is configured to move and hold the position of the lens 320 based on signals received from the OIS/AF controller 355. As discussed above, the OIS/AF actuator 353 may be based on one or more VCMs, where the one or more VCMs include magnets and coils such that the magnets in conjunction with the coils produce a force for moving the lens 320. The OIS/AF actuator 353 may further include position sensors, such as Hall sensors, for detecting the position of the lens 320. In some implementations, OIS and AF functions are integrated together in the OIS/AF actuator 353 and the OIS/AF controller 355 for size and efficiency reasons. However, it will be understood that in some implementations, the OIS actuator 353 may be separate from an AF actuator, and the OIS controller 355 may be separate from an AF controller.

The lens 320 and the OIS/AF actuator 353 may be positioned adjacent to the image sensor 350 so that the image sensor 350 is optically coupled with the lens 320. For example, the lens 320 and the OIS/AF actuator 353 may be positioned above the image sensor 350 as shown in FIG. 3B, though it will be understood that in some implementations the lens 320 and the OIS/AF actuator 353 may be positioned below the image sensor 350. The OIS module/component 302 may further include an OIS gyroscope 356 on the PCB 351, where the OIS gyroscope 356 can detect and measure physical movement of the camera 300. In some implementations, the OIS gyroscope 356 and the OIS/AF controller 355 may be disposed on the PCB 351. Based at least in part on the measurements received from the OIS gyroscope 356, the OIS/AF controller 355 may communicate to the OIS/AF actuator 353 and determine a direction and movement of the lens 320. In some implementations, the OIS module/component 302 further includes a connector 352, which can be used to facilitate electrical connection among various components of the OIS module/component 302 and the camera 300.

Figure 4:
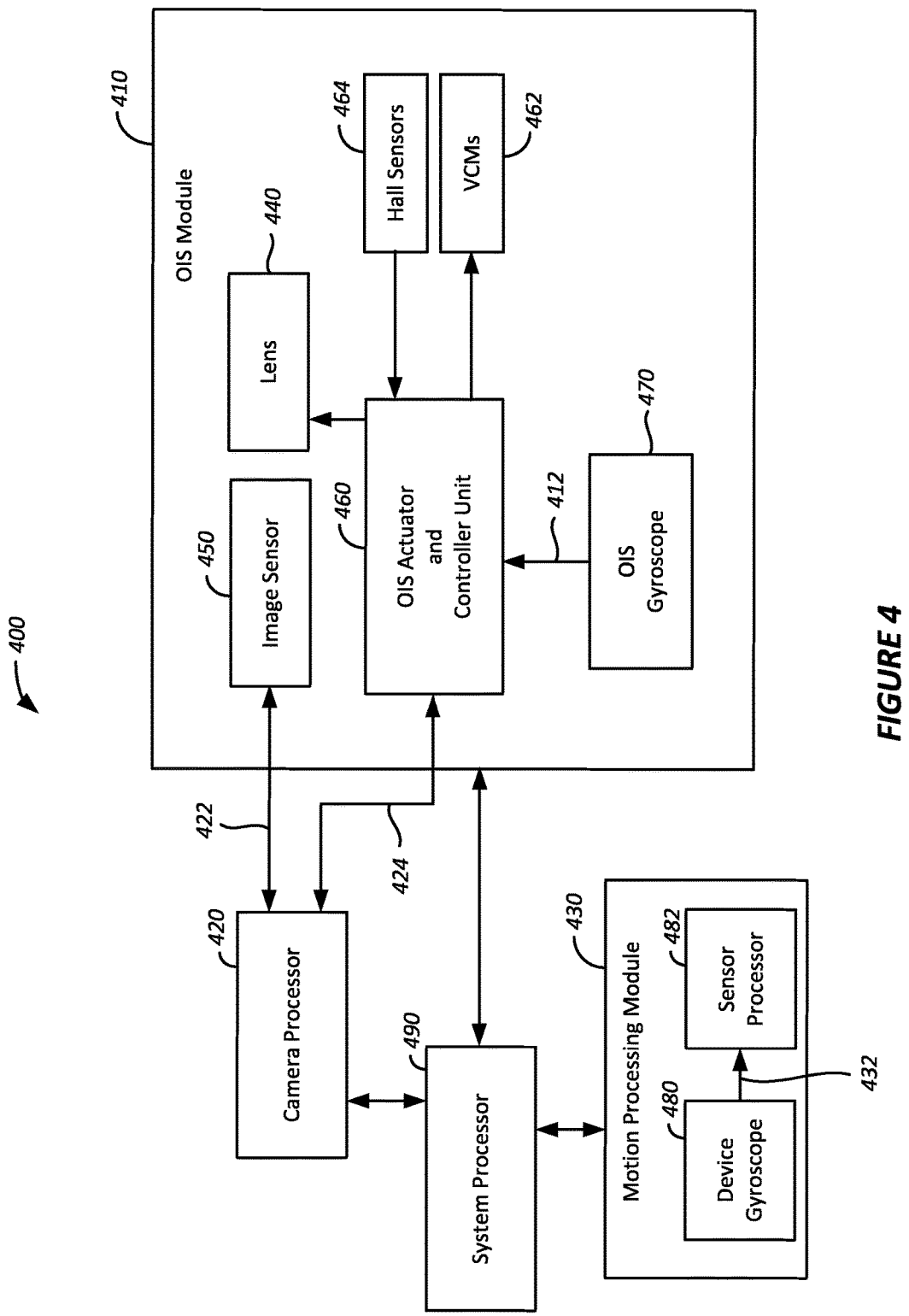
FIG. 4 shows a block diagram representation of an example device including a camera, an OIS module/component with a gyroscope, and a motion processing module/component with a gyroscope according to some implementations.

FIG. 4 shows a block diagram representation of an example device including a camera, an OIS module/component with a gyroscope, and a motion processing module/component with a gyroscope according to some implementations. Typically, a device 400 includes a camera module/component or OIS module/component 410 with an OIS gyroscope 470. The OIS module/component 410 may further include a lens 440 and an image sensor 450, where the lens 440 can be positioned proximate to the image sensor 450 so that the image sensor 450 is optically coupled with the lens 440. The lens 440 is coupled to an OIS actuator and controller unit 460 for controlling movement of the lens 440 for image stabilization. As shown in FIG. 4, the OIS actuator and controller unit 460 is coupled with one or more VCMs 462 for applying electromagnetic force from one or more VCM coils and VCM magnets to actuate the lens 440. The OIS actuator and controller unit 460 is further coupled with one or more Hall sensors 464 for detecting a position of the lens 440. The one or more Hall sensors 464 and the one or more VCMs 462 create a feedback loop for controlling movement of the lens 440 for image stabilization. The OIS gyroscope 470 in the OIS module/component 410 is coupled to the OIS actuator and controller unit 460 through a communication interface 412. In some implementations, the communication interface 412 is serial peripheral interface (SPI).

Having the OIS gyroscope 470, the lens 440, and the image sensor 450 in the OIS module/component 410 allows for the OIS gyroscope 470 and the image sensor 450 to be calibrated with the lens 440 so that their alignment is generally acceptable. The OIS gyroscope 470 and the image sensor 450 may be formed on a common substrate, such as a PCB. The lens 440 may be coupled to the common substrate via the OIS actuator and controller unit 460 formed on the common substrate. Accordingly, in some implementations, the OIS gyroscope 470 and the image sensor 450 may be aligned with the lens 440 since such components may be assembled together with respect to a common substrate.

The device 400 may further include a camera processor 420, where the camera processor 420 interfaces with the OIS module/component 410. The camera processor 420 may be part of a camera of the device 400 that controls and processes the image from the image sensor 450 as well as optics of the image sensor 450. The camera may be any suitable type of image taking device and may be incorporated within the device 400, where the device 400 may constitute a mobile phone (e.g., smartphone), a tablet computer, a laptop, a handheld gaming device, or a wearable device (e.g., smart watch). The camera may be configured to receive light from outside the device 400 through the lens 440 to form an image on the image sensor 450. The camera processor 420 may be equipped with auto-focus (AF) and/or optical image stabilization (OIS) capabilities with respect to the light received by the camera. The camera may include various components such as components shown in FIG. 3A, where the components may include a lens, an image sensor, an image processor, a controller, an encoder, a memory, an analytics component, and a network interface. The lens and the image sensor may be part of an OIS module/component. Various camera functions and operations may be controlled by the camera processor 420. For example, the camera processor 420 may control aperture opening amount, exposure time, white balancing, gamma correction, contrast enhancement, and color correction, among many other camera operations. In some implementations, the camera processor 420 may control and communicate with the image sensor 450 via a communication interface 422, such as a MIPI protocol. In some implementations, the camera processor 420 may control and communicate with the OIS actuator and controller unit 460 via a communication interface 424, such as an inter-integrated circuit (I2C) protocol. An image signal processing (ISP) unit of the camera may process images from the image sensor 450, where the ISP unit may be in communication with the camera processor 420 or may be included in the camera processor 420. The camera processor 420 may control positioning of the lens 440 in the OIS module/component 410 by interfacing with the OIS actuator and controller unit 460.

The device 400 may further include a motion processing module/component 430 configured to detect and measure motion of the device 400. The motion processing module/component 430 may include, for example, accelerometers and gyroscopes. The accelerometers and gyroscopes in the motion processing module/component 430 may be used in a variety of applications, such as navigation, remote control, displaying a picture in a certain orientation, video game control, etc. The motion processing module/component 430 may include a device gyroscope 480 for detecting and measuring angular motion of the device 400. The device gyroscope 480 may also be referred to as a main gyroscope or a user interface gyroscope. The device gyroscope 480 may communicate with a processor 482 of the motion processing module/component 430 via a communication interface 432, such as SPI.

The device 400 may further include a system processor 490 for controlling one or more operations of the device 400. Various components of the device 400 may be coupled to the system processor 490, such as a radio-frequency (RF) component, a battery component, a memory component, etc. In addition, the motion processing module/component 430 and the camera processor 420 may be coupled to the system processor 490. In some implementations, the system processor 490 may be a programmable microprocessor, microcomputer, or multiple processor chip or chips that can be configured by software instructions to perform a variety of functions.

As shown in FIG. 4, the device 400 includes an OIS gyroscope 470 with the OIS module/component 410 and a device gyroscope 480 with the motion processing module/component 430. In some implementations, the device gyroscope 480 and the OIS module/component 410 with the OIS gyroscope 470 may be disposed on a main circuit board of the device 400. Having the device gyroscope 480 and the OIS gyroscope 470 results in a redundancy in the device 400. It is also generally more expensive to have both the device gyroscope 480 and the OIS gyroscope 470 on the main circuit of the device 400. Thus, the redundancy can add to the cost, size, and complexity of the device 400.

Figure 5A:
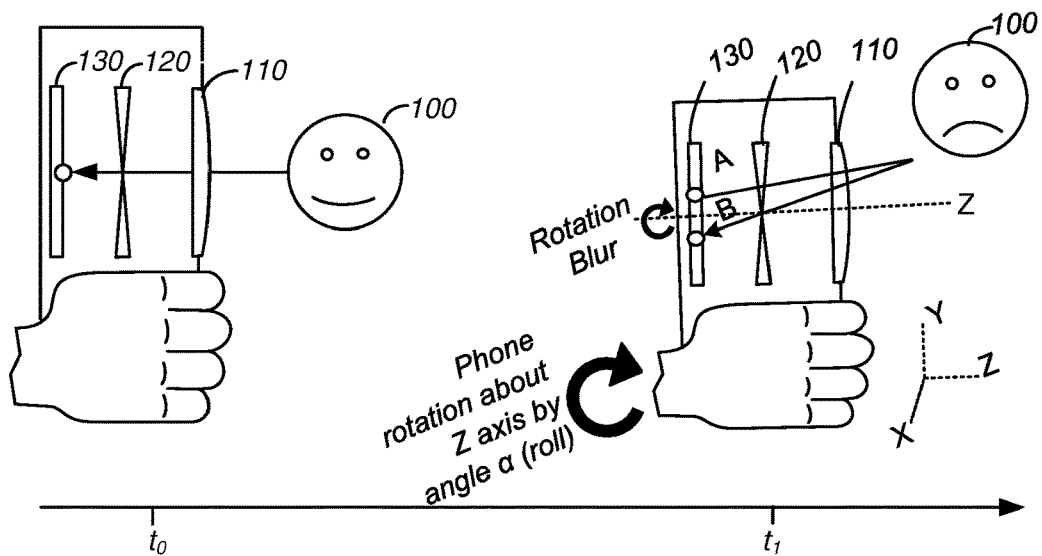
FIG. 5A shows a schematic illustration of the effects of a phone rotation about a lens axis (or Z axis) by an angle of a causing a rotation blur.

FIG. 5A shows a schematic illustration of the effects of rotation about the Z axis (roll) on images without correction by a correction element. Typically, roll tremors can result in vibration identifiable as an oscillating signal with an amplitude and frequency, such as an amplitude of about 0.5 degrees and a frequency in the range of about 2 Hz to about 20 Hz. In FIG. 5A, a target 100 can be captured by a camera via an optical path through a lens 110 of the camera. At time $t_0$ the optical path passes through the lens 110 and a correction element 120 and onto an image sensor or imager 130. Between time $t_0$ and $t_1$, rolling motion occurs that changes the optical path from the target 100 to the image sensor 130. The rolling causes the lens 110 to move, thereby changing the optical path when the correction element 120 does not correct for the change in the optical path. The image on the image sensor 130 shifts from point A to point B at time $t_1$. The result can be a rotational blurring of the image on the image sensor 130.

Figure 5B:
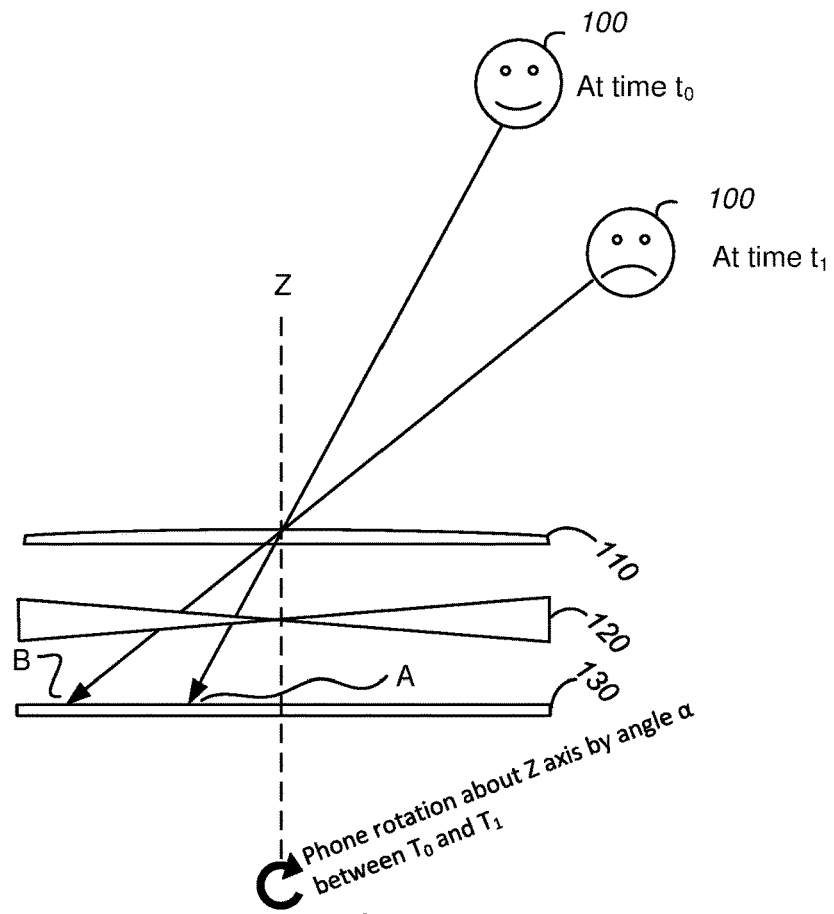
FIG. 5B shows a schematic illustration of the effects of a phone rotation about a Z axis by an angle of a shifting the location of an image.

FIG. 5B shows a schematic illustration of the effects of rolling on images with correction by a correction element. As in FIG. 5A, a target 100 can be captured by a camera via an optical path through a lens 110 of the camera at time $t_0$. In spite of the rolling between time $t_0$ and $t_1$, the image on the image sensor 130 does not shift because of roll compensation by the correction element 120. As opposed to conventional OIS systems, the correction element 120 uses adjusted input from the OIS gyroscope 356 or adjusted input from the device gyroscope 480. The correction element 120 can move between time $t_0$ and $t_1$ to re-adjust the optical path so that the image on the image sensor is the same at time $t_0$ and $t_1$, by taking into account adjusted gyroscope measurements. As in FIG. 1B, in some implementations, the correction element 120 can be a lens or another moving part of the camera that corrects the optical path, such as a part that corrects a position of the lens 110.

Figure 6:
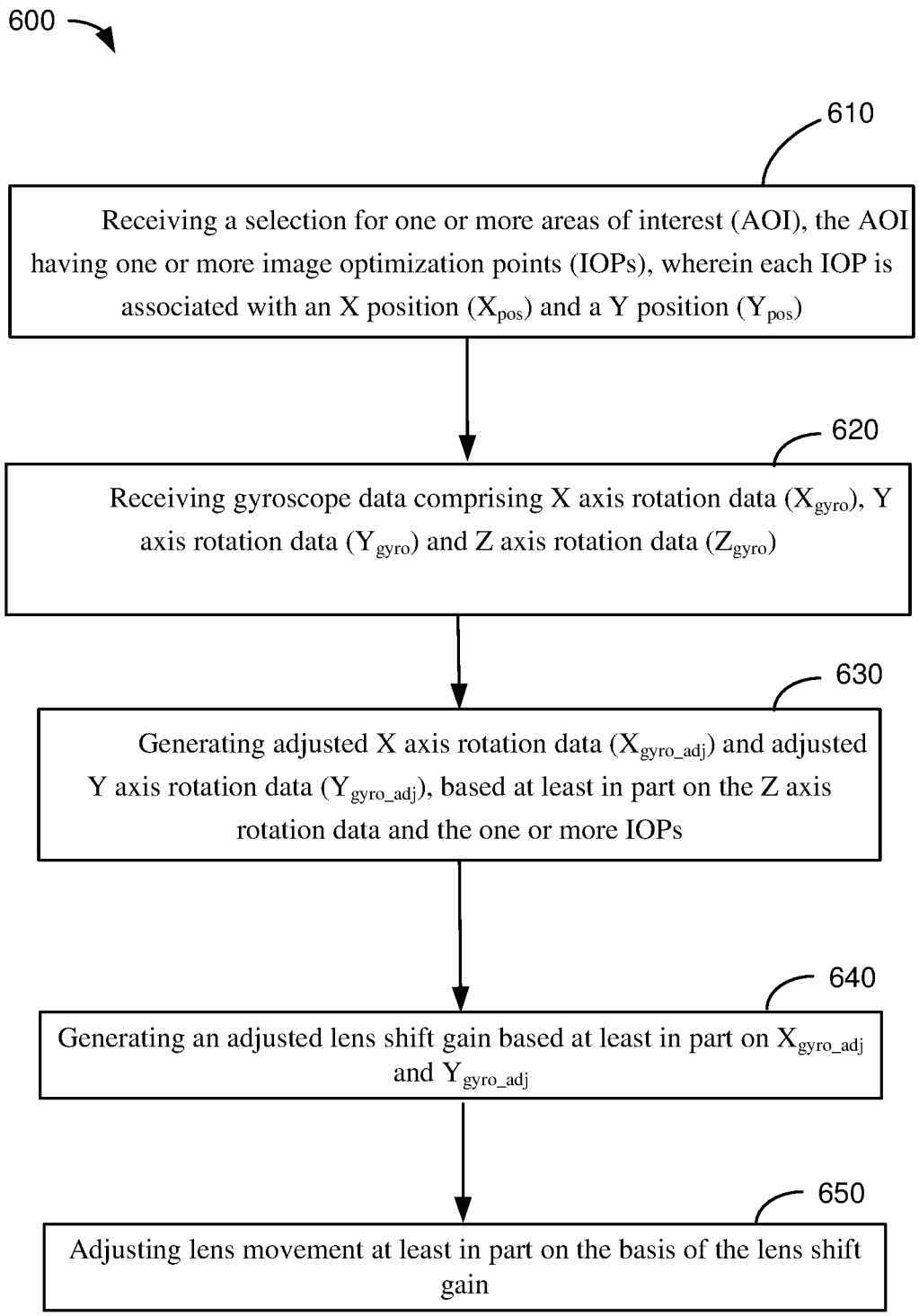
FIG. 6 shows a flow diagram illustrating an example method of tuning OIS gain compensation in an electronic device according to some implementations.

FIG. 6 shows a flow diagram of a method 600 for adjusting lens movement to image movement by an OIS module/component, wherein the OIS module/component may have a lens and an image sensor optically coupled with the lens. At box 610, the OIS module/component or controller receives a selection for one or more areas of interest (AOI), the AOI having one or more image optimization points (IOPs), wherein each IOP is associated with an X position ($X_{pos}$) and a Y position ($Y_{pos}$). At box 620, the OIS module/component or controller receives gyroscope data comprising X axis rotation data ($X_{gyro}$), Y axis rotation data ($Y_{gyro}$) and Z axis rotation data ($Z_{gyro}$). At box 630, the OIS module/component or controller adjusts lens shift gain, wherein adjusting lens shift gain comprises generating adjusted X axis rotation data ($X_{gyro\_adj}$) and Y axis rotation data ($Y_{gyro\_adj}$), wherein $X_{gyro\_adj}$ and $Y_{gyro\_adj}$ are generated based at least in part on the Z axis rotation data and the one or more IOPs. At box 640, the OIS module/component or controller generates an adjusted lens shift gain based at least in part on $X_{gyro\_adj}$ and $Y_{gyro\_adj}$. At box 650, the OIS module/component or controller adjusts adjusting lens movement based at least in part on the lens shift gain. The OIS module/component may comprise a set of components, one or more processors, DSPs, ASICS, or other modules that make up an OIS system.

In some embodiments for adjusting lens movement to image movement in an OIS module/component, where a device is undergoing a tremor or rotation around the Z axis, the device may apply a translation or rotation matrix to the gyroscope measurements or image in order to determine a relationship between the gyroscope movement and lens movement, or the gyroscope movement and image movement. The device may also apply a rotation matrix to determine the relationship between the lens movement and image movement. The relationship between a lens movement and image movement in the OIS module/component may include a 2×2 rotation matrix, and the relationship between the gyroscope movement and lens movement may include a 3×2 rotation matrix.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules/components, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules/components, circuits and processes described above. Whether such functionality is implemented in hardware or software depends upon the particular application and design constraints imposed on the overall system.

The hardware and data processing apparatus used to implement the various illustrative logics, logical blocks, modules/components and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method for image stabilization comprising:
   receiving a selection for one or more areas of interest (AOI), the AOI having one or more image optimization points (IOPs), wherein each IOP is associated with an X position ($X_{pos}$) and a Y position ($Y_{pos}$);
   receiving gyroscope data comprising X axis rotation data ($X_{gyro}$), Y axis rotation data ($Y_{gyro}$) and Z axis rotation data ($Z_{gyro}$);
   generating adjusted X axis rotation data ($X_{gyro\_adj}$) and adjusted Y axis rotation data ($Y_{gyro\_adj}$), based at least in part on the Z axis rotation data and the one or more IOPs;
   generating an adjusted lens shift gain based at least in part on $X_{gyro\_adj}$ and $Y_{gyro\_adj}$; and
   adjusting lens movement based at least in part on the adjusted lens shift gain.

2. The method of claim 1, wherein:

$$X_{gyr\_adj} = X_{gyro} \pm Y_{pos} * Z_{gyro}$$

$$Y_{gyr\_adj} = Y_{gyro} \pm X_{pos} * Z_{gyro}.$$

3. The method of claim 1, wherein the selection of one or more AOIs is based at least in part upon a user selection on a touchscreen.

4. The method of claim 1, wherein the selection of one or more AOIs is based at least in part upon tracking an object within a field of view of a lens.

5. The method of claim 1, wherein the selection of one or more AOIs is based upon an auto focus algorithm.

6. The method of claim 1, wherein the selection of one or more AOIs is based upon a maximum blur measurement.

7. The method of claim 1, wherein the one or more AOIs is defined in terms of pixels.

8. The method of claim 1, wherein the one or more AOIs is defined in terms of deviation angle from image center.

9. The method of claim 1, wherein the one or more IOPs is based upon a weighted average of the one or more AOIs.

10. An apparatus for adjusting lens movement, comprising:
    a lens;
    a gyroscope; and
    an OIS controller, wherein the OIS controller is operably configured to:
    receive a selection for one or more areas of interest (AOI), the AOI having one or more image optimization points (IOPs), wherein each IOP is associated with an X position ($X_{pos}$) and a Y position ($Y_{pos}$);
    receive gyroscope data comprising X axis rotation data ($X_{gyro}$), Y axis rotation data ($Y_{gyro}$) and Z axis rotation data ($Z_{gyro}$);
    adjust lens shift gain, wherein adjusting lens shift gain comprises generating adjusted X axis rotation data ($X_{gyro\_adj}$) and Y axis rotation data ($Y_{gyro\_adj}$), wherein $X_{gyro\_adj}$ and $Y_{gyro\_adj}$ are generated based at least in part on the Z axis rotation data and the one or more IOPs; and
    adjust lens movement based at least in part on the lens shift gain.

11. The apparatus of claim 10, wherein:

$$X_{gyr\_adj} = X_{gyro} \pm Y_{pos} * Z_{gyro}$$

$$Y_{gyr\_adj} = Y_{gyro} \pm X_{pos} * Z_{gyro}.$$

12. The apparatus of claim 10, wherein the selection of one or more AOIs is based at least in part upon a user selection on a touchscreen.

13. The apparatus of claim 10, wherein the selection of one or more AOIs is based at least in part upon tracking an object within a field of view of the lens.

14. The apparatus of claim 10, wherein the selection of one or more AOIs is based upon an auto focus algorithm.

15. The apparatus of claim 10, wherein the selection of one or more AOIs is based upon a maximum blur measurement.

16. The apparatus of claim 10, wherein the one or more AOIs is defined in terms of pixels.

17. The apparatus of claim 10, wherein the one or more AOIs is defined in terms of deviation angle from image center.

18. The apparatus of claim 10, wherein the one or more IOPs is based upon a weighted average of the one or more AOIs.

19. An image stabilizer comprising:
    means for adjusting lens movement to image movement in an optical wherein the means for adjusting lens movement comprises a lens and an image sensor optically coupled with the lens and a means for controlling the lens movement, wherein the means for controlling is operably configured for:
    receiving a selection for one or more areas of interest (AOI), the AOI having one or more image optimization points (IOPs), wherein each IOP is associated with an X position ($X_{pos}$) and a Y position ($Y_{pos}$);
    receiving gyroscope data comprising X axis rotation data ($X_{gyro}$), Y axis rotation data ($Y_{gyro}$) and Z axis rotation data ($Z_{gyro}$);
    adjusting lens shift gain, wherein adjusting lens shift gain comprises generating adjusted X axis rotation data ($X_{gyro\_adj}$) and Y axis rotation data ($Y_{gyro\_adj}$), wherein $X_{gyro\_adj}$ and $Y_{gyro\_adj}$ are generated based at least in part on the Z axis rotation data and the one or more IOPs; and
    adjusting lens movement based at least in part on the lens shift gain.

20. The image stabilizer of claim 19, wherein:

$$X_{gyr\_adj} = X_{gyro} \pm Y_{pos} * Z_{gyro}$$

$$Y_{gyr\_adj} = Y_{gyro} \pm X_{pos} * Z_{gyro}.$$

21. The image stabilizer of claim 19, wherein the selection of one or more AOIs is based at least in part upon a user selection on a touchscreen.

22. The image stabilizer of claim 19, wherein the selection of one or more AOIs is based at least in part upon tracking an object within a field of view of the lens.

23. The image stabilizer of claim 19, wherein the selection of one or more AOIs is based upon an auto focus algorithm.

24. The image stabilizer of claim 19, wherein the selection of one or more AOIs is based upon a maximum blur measurement.

25. The image stabilizer of claim 19, wherein the one or more AOIs is defined in terms of pixels.

26. The image stabilizer of claim 19, wherein the one or more AOIs is defined in terms of deviation angle from image center.

27. The image stabilizer of claim 19, wherein the one or more IOPs is based upon a weighted average of the one or more AOIs.

* * * * *